United States Patent Office 3,629,362
Patented Dec. 21, 1971

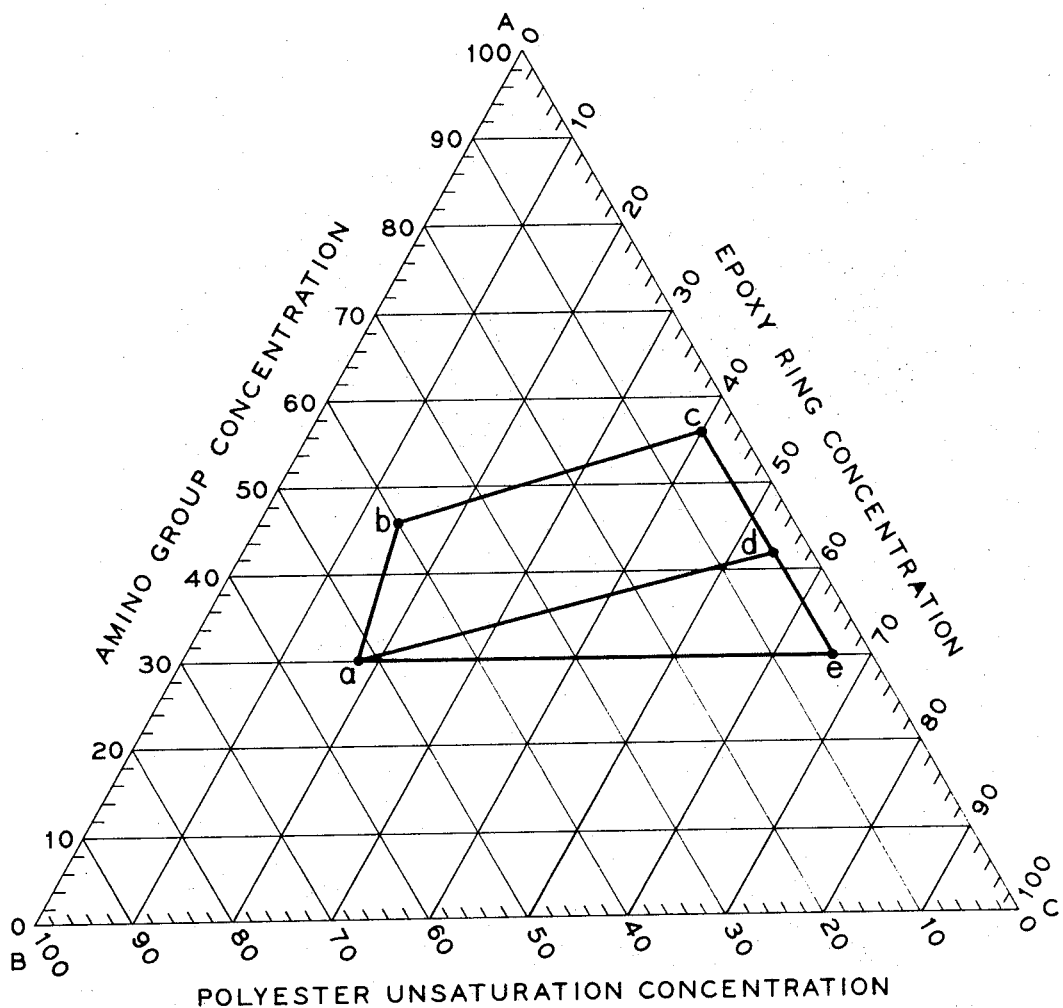

3,629,362
THERMOSET POLYESTER RESINS
Earl F. Carlson, El Cerrito, Calif., assignor to Chevron Research Company, San Francisco, Calif.
Filed Feb. 6, 1969, Ser. No. 796,982
Int. Cl. C08g 45/14, 51/28
U.S. Cl. 260—835                                    11 Claims

ABSTRACT OF THE DISCLOSURE

Novel thermoset resins comprise a reaction product mixture of an unsaturated polyester, a polyfunctional amine, a polybutene and, optionally, an epoxide resin.

BACKGROUND OF THE INVENTION

This invention relates to the field of thermoset resins and more particularly to thermoset resin compositions containing polybutenes.

It is known that polybutene compounds are both economically available and possess unusually low electrical conductivity. These properties are highly desirable for use in resin applications, such as, encasing electrical circuits, electrical circuit coatings and as nonconducting adhesives. Heretofore, however, polybutenes have not been utilized in thermoset resins because they are viscous liquids at the temperatures of resin application, and consequently it was believed that they would not retain their shape or properly gel in resin compositions.

We have now found that these problems can be overcome by properly selecting the polybutene component and incorporating it into the polyester resin compositions in accordance with the present invention to provide hard, resilient plastics which maintain their shape and gel quickly.

SUMMARY OF THE INVENTION

In accordance with the present invention, it has now been discovered that novel polyester thermoset resin compositions comprise a reaction product mixture of (1) an ethylenically unsaturated polyester, (2) a polyfunctional primary amine, (3) a polybutene having a viscosity rating of at least 2,000 SUS at 210° F. and (4) an epoxy resin. The resin compositions of the present invention form excellent hard, tough, resilient, solid plastics suitable for use as adhesives, coating substances, or as potting compounds.

The fact that these mixtures incorporate liquid polybutene in a stable, solid system is surprising since other liquids such as white oil, xylene, and other hydrocarbon materials do not form stable products.

The unsaturated polyester component of the thermoset resins may be prepared in conventional fashion by the esterification of a dihydroxy alcohol with a dicarboxylic acid or anhydride. Accordingly, the reaction can be carried out at temperatures of about 150° C. to 250° C. in an atmosphere of inert gas, such as nitrogen or carbon dioxide, water formed during reaction being removed by distillation. If desired, the esterification reaction may be catalyzed by acids or acid salts, soluble in the reaction mixture, for example, p-toluene sulfonic acid. Premature cross-linking of the double bonds during esterification and, consequently, gellation may be obviated by the use of inhibitors, such as hydroquinone, resorcinol, pyrogallol, tertiarybutyl catechol, phenylene diamines, aniline, benzaldehyde, or ascorbic acid. While in general equal molecular proportions of glycol and dibasic acids can be employed, a slight stoichiometric excess of glycol, from 3–10 mole percent over total acid material, is preferably employed to compensate for loss of glycol material during reaction. The extent of reaction can be followed by acid number determination (acid number being defined as the number of milligrams of potassium hydroxide equivalent to the free acid in 1 gram of resin), and by viscosity determinations in an appropriate solvent, in common practice acid number determinations alone being satisfactory where the manufacturing process has been standardized. In general, polyesterification is conducted to a resin of acid number below 50, and preferably below 30. In other words, the polyester component has a number average molecular weight in the range 1,000–3,000, preferably around 2,000–3,000. (Principals of Polymer Chemistry, pp. 273 et. seq., Paul J. Flory, Cornell University Press, Ithica, N.Y. 1953.)

The unsaturated polyester may be derived in the manner described above by reacting appropriate amounts of an aliphatic glycol, such as ethylene glycol, and an unsaturated aliphatic dicarboxylic acid, such as maleic acid or its anhydride. In addition to ethylene glycol, other glycols may be employed, including diethylene glycol, triethylene glycol, 1,3-trimethylene glycol, 1,2-propylene glycol, dipropylene glycol, butylene glycol, styrene glycol, halogen-substituted glycols of the above, polyethylene glycol, tetramethylene glycol, pentamethylene glycol, hexamethylene glycol, octamethylene glycol, tetraethylene glycol, neopentyl glycol, and xylylene diol. As is known in the art, the reactive double bond in the unsaturated polyester can be contributed by the use of an unsaturated glycol, such as 2-butene-1,4-diol; 2,5-dimethyl 3-hexene-2,5-diol or 3,6-dimethyl 4-octene-3,6-diol. In general, however, because of economics, it is preferred to use an unsaturated dibasic acid as the source of the reactive double bond.

In place of maleic acid, other unsaturated diacids can be employed, such as fumaric acid, mesaconic acid, itaconic acid, citraconic acid, ethyl maleic acid, chloromaleic acid, bromomaleic acid, chlorofumaric acid, and bromofumaric acid.

Further, as known in the art, the unsaturated polyester can be desirably modified by replacing part of the ethylenically unsaturated dibasic acid with other aromatic and aliphatic acids free of ethylenic unsaturation. Examples of such acids which can be employed in mole ratios thereof to unsaturated acid ranging from 1:3 to 1:1 are phthalic acid, isophthalic acid, terephthalic acid, tetrachlorophthalic acid, succinic acid, adipic acid, suberic acid, azelaic acid, dimethylsuccinic acid, oxalic acid, malonic acid, guitaric acid, pimelic acid, biphenyldicarboxylic acid, naphthalenedicarboxylic acid, cyclohexanedicarboxylic acid, pyrotartaric acid, and sebacic acid.

The polyfunctional primary amine (polyamine) component must contain at least two primary amino groups ($-NH_2$). The preferred concentration of the amine component present in the thermoset resin will vary somewhat depending on the particular amine. In general, suitable amines include: metaxylylene diamine, paraxylylene diamine, p-phenylene diamine, $\omega,\omega'$-diamino-p-diethylbenzene, 2-(2-aminoethylamino) ethanol, ethylene diamine, diethylene triamine, triethylene tetramine, tetraethylene pentamine, and hexamethylene diamine, etc. Preferably, the polyamine is metaxylylene diamine or 2-(2-aminoethylamino) ethanol.

The polybutene component of the present compositions may have a viscosity of at least about 2000 SUS at 210° F. and as high as 20,000 SUS at 210° F. Polybutene compounds within this viscosity range are usually viscous liquids having a molecular weight of between about 1400 to 2700. The more viscous polybutenes possessing good dielectric properties are preferred and are commercially available. U.S. Pat. No. 2,970,179 describes a method of preparing polybutenes suitable for use in the present invention.

The epoxy component of this invention may be defined generally as being a complex polyether containing an epoxy group at both ends of the chain, derived from a dihydric phenol containing not more than 2 phenolic hydroxyl groups. These ethers are linear polymers which can be obtained by condensing, in the presence of caustic alkali, an epoxide such as epichlorohydrin, with a phenolic compound, the most widely known being the diglycidyl polyethers of bis(4 - hydroxyphenol) - 2,2 - propane, or bisphenol-A, and having the general formula:

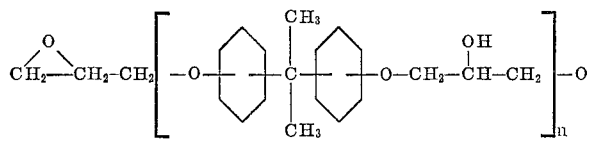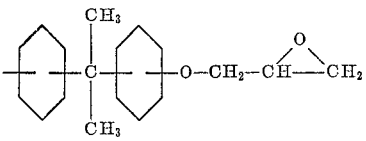

The epoxides herein contemplated are those which are either viscous liquids or low-melting solids and are soluble in a number of solvents, e.g., ketones, chlorinated hydrocarbons, glycol ethers, aromatic hydrocarbons, such as xylene and toluene, etc. Thus, those epoxides are contemplated which are normally liquid or capable of being rendered liquid by warming or mixing with the solvent, so that the mixture of polyester and epoxide resin is liquid. In general, suitable polyethers are those in which n in the above formula ranges from 0 to 7, indicating molecular weights of approximately 350 to 2300, or in other words, suitable epoxy compounds are those having epoxy equivalents ranging from 175 to 1150, preferably 175 to 300, obtained by dividing the molecular weight by the number of epoxy groups in the molecule.

In the formulation of the compositions herein contemplated, the proportions of unsaturated polyester, epoxide and amine compounds are based upon the total moles of unsaturated carbon-carbon double bonds in the polyester, amino groups in the amine, and epoxy rings in the epoxides as described subsequently. Theoretically, the number of amino groups necessary reaches the maximum when enough amine is present to provide active hydrogens to saturate the carbon-carbon double bond of the polyester and to react with the epoxy rings of the epoxide. For example, the number of primary amino groups may be determined by the equation $$M = X + \frac{Y}{2}$$

wherein M represents the number of moles of primary amino groups (—NH₂) required; X represents the number of moles of epoxy rings

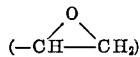

present in the epoxide; and Y represents the number of moles of carbon-carbon double bonds (>C=C<) present.

In practice, the number of amino groups may vary somewhat from the theoretical value as determined by the above equation. The proportions of polyester are computed on the basis of degree of unsaturation in the polyester, denoted as polyester unsaturation, i.e., for calculations, the moles of polyester are equivalent to moles of C=C bonds in the polyester. In other words, the moles of polyester are generally equivalent to the number of moles of unsaturated acid employed in the preparation of the polyester.

The proportions in moles of polyester, polyamine and epoxide can be determined from the area defined by the points a, b, c and d of the annexed triangular coordinate graph. When the polyamine is metaxylylene diamine the proper mole ratio can be determined from the larger area defined by a, b, c and e. Referring to the graph, it will be noted that satisfactory compositions will contain 30 to 56 mole percent of amino groups, about 4 to 52 mole percent of polyester unsaturation; and from 14 to 54 mole percent of epoxy rings. When the amine is metaxylylene diamine the concentration of epoxy rings may range from 14 to 66 mole percent.

The compounds of the present invention are preferably prepared by first mixing the polyester resin with the epoxide. In some cases, it is necessary to reduce the viscosity of either or both of the polyester and epoxide, by heating, to effect good mixing. Temperatures of less than 100° C. are preferred for the heating operation. When completely mixed, polybutene is added, and the resulting non-homogenous system is stirred until it forms a uniform mixture. After mixing to uniform solution, the calculated amount of polyamine is added and the entire system is stirred and subsequently poured into a mold or utilized in other applications. The resulting compounds are then cured either at room temperature or at any desired elevated temperature. In general, it is preferred to mix the compounds at room temperature and then heat to an elevated temperature to shorten gel time.

The amount of polylbutene incorporated in the resin compositions of the present invention varies from about as little as 5% to as much as 65% by weight of the total resin composition. The maximum amount will vary depending upon the viscosity of the polybutene used, but in general, will range from about 60 to 65% by weight of the total resin composition. The maximum quantity of polybutene applicable for a particular viscosity range may be determined by observing the points of inversion obtained upon adding increased amounts of polybutene to the resin composition. This method is further detailed in the subsequent examples. Preferably about 25 to 50% by weight of polybutene of the total resin composition is employed to make highly satisfactory compounds.

The practice of the present invention is illustrated by the following examples.

Example 1.—Preparation of an unsaturated polyester

A 5-liter, round-bottom flask equipped with a stirrer, a thermometer, a nitrogen gas inlet and a steam-heated condenser was charged with 620 g. (5.25 moles) of 1,6-hexanediol and 490 g. (5.0 moles) of maleic anhydride. This mixture was stirred and heated under nitrogen at a temperature of 400° F. for five hours, during which time 84 g. of water was removed through the condenser. At the end of this time, the product was allowed to cool to room temperature. 1000 g. of polyester was recovered.

Example 2.—Preparation of polyester-epoxy resin mixtures

The same apparatus as used in Example 1 was charged with 655 g. (6.3 moles) of neopentyl glycol, 486 g. (2.0 moles) of octenyl succinic anhydride, and 392 g. (4.0 moles) of maleic anhydride. The mixture was heated to a temperature of 400° F. It was stirred and held at this temperature for approximately 3½ hours while under a nitrogen atmosphere. The water formed during reaction (about 100 g.) was removed through the condenser. At the end of this time, the reaction mixture was cooled to 300° F. and 1407 g. of an epoxy resin (Dow DER–331; the reaction product of bisphenol-A and epichlorohydrin having an epoxy equivalent weight of 187) was added. The resulting mixture was stirred and heated at 300° F. under nitrogen for 1¼ hours, after which it was cooled to room temperature. 2800 g. of polyester epoxy resin mixture was recovered.

Example 3.—Preparation of polyester-epoxy resin mixture

The procedure of Example 2 was repeated, using 984 g. of neopentyl glycol, 588 g. of maleic anhydride and 438 g. of adipic acid to make polyester. The polyester product was treated with 1815 g. of the same epoxy compound as used in Example 2. 3750 g. of polyester-epoxy resin mixture was recovered.

Example 4.—Preparation of thermoset resin compositions without epoxide

A 150 ml. beaker was charged with 44 g. of the epoxy-polyester of Example 2 and 50 g. of polybutene having a viscosity of 20,000 SUS at 210° F. The mixture was stirred until a homogeneous mass was obtained. Then 6 g. of metaxylylenediamine was added and the entire mixture once again stirred until homogenity was obtained. The resulting mixture was poured into a 15 ml. polyethylene cup and allowed to gel at room temperature. After 18 hours, the gelled material was removed from the cup and heated for 1 hour at 150° C. to give a resilient, nearly transparent product.

The procedure of Example 4 was followed, substituting for the epoxy-polyester the mixture of Example 3 and pure epoxy resin. The various amounts of ingredients are given in Table I. The polyester-epoxy mixtures with 50 percent polybutene formed stable dispersions of very fine particle size which were translucent in appearance. The mixture which contained no polyester (Example 6) was less viscous and separated into two phases.

TABLE I

| Example [1] | Grams of— | | | | metaxylylene diamine |
|---|---|---|---|---|---|
| | Epoxy resin | Ex. 1 | Ex. 2 | Ex. 3 | |
| 4 | | | 44 | | 6 |
| 5 | | | | 43.5 | 6.5 |
| 6 | 42.5 | | | | 7.5 |

[1] Each of the above mixtures contain 50 g. of polybutene having the same viscosity as that used in Example 4.

Example 7.—Extraction of polybutent from thermoset resin compositions

A 150 ml. beaker was charged with 20 g. of the polyester-epoxy product of Example 3, 23 g. of Dow 331 epoxy resin, and 50 g. of a polybutene having a viscosity of 20,000 SUS at 210° F. After thorough mixing, 7 g. of metaxylylene diamine was added and the entire mixture stirred to a homogenous mass. The procedure of Example 4 was followed to give, after heating and curing, a resilient, nearly transparent product. The product was immersed in Chevron 350 thinner (a hydrocarbon solvent having about 17 percent aromatics, 40 percent naphthenics, and the remainder paraffins, and boiling over the range of about 300–400° F.) and maintained at a temperature of 100° C. for approximately 15 hours. After immersion, the casting was removed and the hydrocarbon solvent was evaporated off to leave approximately 0.5 g. of extracted polybutene. Accordingly, approximately 99 percent of the polybutene remained in the casting.

The procedure of Example 7 was followed, except that the amount of epoxide and polyester was varied. The amount of polybutene extracted is shown in Table II below. Excellent adhesion to glass was observed with the mixture containing 80 percent epoxy resin and 20 percent unsaturated polyester.

TABLE II.—STABILITY OF RESIN COMPOSITIONS

| Example | Epoxy resin, percent | Epoxy resin (additional) | Product of Example 3 | Grams of— Product of Example 1 | Metaxylylene diamine | Polybutene extracted |
|---|---|---|---|---|---|---|
| 7 | 80 | 23 | 20 | | 7 | 0.5 |
| 8 | 0 | | | 41 | 9 | 4.1 |
| 9 | 10 | | 10 | 31 | 9 | 2.2 |
| 10 | 20 | | 20 | 22 | 8 | 1.3 |
| 11 | 30 | | 30 | 13 | 7 | 1.4 |
| 12 | 40 | | 40 | 3 | 7 | 1.7 |
| 13 | 50 | | 43 | | 7 | 1.5 |
| 14 | 60 | 3 | 40 | | 7 | 1.1 |
| 15 | 70 | 13 | 30 | | 7 | 0.8 |
| 16 | 90 | 32 | 10 | | 8 | 0.4 |
| 17 | 100 | 42 | | | 8 | ([1]) |

[1] This mixture separated into two layers before gellation.

In a test to measure the maximum compatible polybutene content in the resin compositions, 1:1 blends of unsaturated polyester and epoxy resin containing varying amounts of a polybutene having a viscosity of 20,000 SUS at 212° F. were cured with varying amounts of metaxylylenediamine (MXDA). Thick films of the resin compositions on glass plates were cured one hour at 150° C. and then placed in Chevron 350 thinner solvent at room temperature. The effect of the solvent on the films is shown in Table III below.

TABLE III
Thermoset Resin Compositions Containing Increased Amounts of Polybutene

| Example | Grams of— | | Percent by weight of total resin of polybutene | Effect of solvent |
|---|---|---|---|---|
| | MXDA | Polyester-epoxy of Example 3 | | |
| 18 | 5.5 | 34.5 | 66 | Unaffected. |
| 19 | 5.0 | 33 | 62 | Do. |
| 20 | 5.0 | 31 | 64 | Do. |
| 21 | 4.5 | 29.5 | 66 | Sloughs off. |
| 22 | 4.5 | 27.5 | 68 | Do. |
| 23 | 4.0 | 26 | 70 | Do. |

A phase reversal occurred at about 65% polybutene content. It appeared to be similar to phase reversals observed in oil-in-water to water-in-oil emulsions.

Example 24

A resin composition was prepared in accordance with Example 4 with 43 g. of the polyester-epoxy mixture of Example 3 and 50 g. of the polybutene having a viscosity of 2450 SUS at 210° F. and 7 g. of MXDA. The resin composition obtained in this manner produced a fine dispersion.

Example 25

A resin composition was prepared in accordance with Example 22, except that 50 g. of a polybutene having a viscosity of 1050 SUS at 210° F. was utilized. This mixture was coarse and showed considerable bleeding of polybutene. Consequently, polybutenes having viscosities of at least 2000 and preferably 2400 SUS are necessary to produce stable resin compositions.

Other polyamines in varying amounts were tested in the resin compositions prepared from 50 g. of the polyester-epoxy mixture of Example 3 and 50 g. of a polybutene having a viscosity of 2450 SUS at 210° F. The resin-polybutene mixtures were heated on a steam plate before the addition of the polyamine. The results are given in Table IV below.

TABLE IV
Thermoset Resin Compositions with Various Polyamines

| Example | Polyamine | Amount in grams | Effect |
|---|---|---|---|
| 26 | Ethylenediamine | 3.5 | Soft cheesey-like products which exuded polybutene. |
| 27 | Diethylenetriamine | 4.5 | |
| 28 | Piperazine | 7.5 | Hard coarse gel which exuded polybutene. |
| 29 | 2-(2-aminoethylamino) ethanol | 7.5 | Good dispersions obtained. |
| 30 | Ethylenediamine | 7.0 | |
| 31 | Diethylenetriamine | 9.0 | |

As will be evident to those skilled in the art, various modifications of the present invention can be made or followed in the light of the foregoing disclosure and discussion without departing from the spirit or scope of the disclosure in the following claims.

I claim:

1. A thermost resin composition having excellent electrical insulating properties comprising the reaction product of a mixture of (I) an ethylenically unsaturated polyester obtained by the esterification of a dihydroxy alcohol with an ethylenically unsaturated dicarboxylic acid or anhydride, (II) a polyamine having at least two amine groups,
(III) an epoxide resin which is a complex polyether chain containing an epoxy group at both ends of the chain, said epoxide being derived from a dihydric phenol containing not more than two phenolic hydroxyl groups, and
(IV) a polybutene having a viscosity of at least 2000 SUS at 210° F., wherein I, II, and III comprise from 35 to 95% by weight of the mixture and the relative molar proportions of I, II, and III are defined by the area $a, b, c, e$ of the annexed drawing, with the proviso that when the polyamine (I) is one other than metaxylylene diamine, said proprtions are defined by the area $a, b, c, d$ of said drawing;

and wherein the polybutene (I) is present in the amount of from 5 to 65% by weight of said mixture.

2. A resin composition as in claim 1 wherein said polyamine is selected from the group consisting of 2-(2-aminoethylamino) ethanol, ethylene diamine and diethylene triamine and the epoxide is present in an amount of from 14 to 54 mole percent of epoxy rings.

3. A resin composition as in claim 1 wherein said polyamine is metaxylylene diamine.

4. A resin composition as in claim 2 wherein the unsaturated polyester has an acid number below about 50.

5. A resin composition as in claim 4 wherein the polybutene has a viscosity of at least 2400 SUS at 210° F. and is present in an amount of from 25 to 50% by weight of the mixture.

6. A resin composition as in claim 5 wherein the epoxide resin has an epoxide equivalent of from 175 to 1150.

7. A resin composition as in claim 6 wherein the polyester is prepared from a glycol selected from the group consisting of hexamethylene glycol and neopentyl glycol; and an acid selected from the group consisting of maleic, fumaric and itaconic.

8. A resin composition as in claim 3 wherein the unsaturated polyester has an acid number below about 50.

9. A resin composition as in claim 8 wherein the polybutene has a viscosity of at least 2400 SUS at 210° F. and is present in an amount of from 25 to 50% by weight of the mixture.

10. A resin composition as in claim 9 wherein the epoxide resin has an epoxide equivalent of from 175 to 1150.

11. A resin composition as in claim 10 wherein the polyester is prepared from a glycol selected from the group consisting of hexamethylene glycol and neopentyl glycol; and an acid selected from the group consisting of maleic, fumaric and itaconic.

References Cited
UNITED STATES PATENTS

| | | | |
|---|---|---|---|
| 3,027,279 | 3/1962 | Kurka et al. | 260—835 |
| 3,100,160 | 8/1963 | Korpman | 260—837 |
| 3,340,212 | 9/1967 | Tomita | 260—835 |
| 3,383,434 | 5/1968 | Carlston | 260—835 |

JOHN C. BLEUTGE, Primary Examiner

U.S. Cl. X.R.

117—124 E; 260—33.6 EP, 873